US008571244B2

(12) United States Patent
Salvetti

(10) Patent No.: US 8,571,244 B2
(45) Date of Patent: Oct. 29, 2013

(54) APPARATUS AND METHOD FOR DYNAMIC DETECTION AND ATTENUATION OF PERIODIC ACOUSTIC FEEDBACK

(75) Inventor: Arthur Salvetti, Colorado Springs, CO (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 677 days.

(21) Appl. No.: 12/408,928

(22) Filed: Mar. 23, 2009

(65) Prior Publication Data

US 2009/0245552 A1 Oct. 1, 2009

Related U.S. Application Data

(60) Provisional application No. 61/039,355, filed on Mar. 25, 2008.

(51) Int. Cl.
*H04L 25/00* (2006.01)

(52) U.S. Cl.
USPC .......................... 381/318; 381/317; 381/77.11

(58) Field of Classification Search
USPC ................... 381/106, 312–318, 83, 68, 77.11
See application file for complete search history.

(56) References Cited

U.S. PATENT DOCUMENTS

| | | | |
|---|---|---|---|
| 3,601,549 | A | 8/1971 | Mitchell |
| 3,803,357 | A | 4/1974 | Sacks |
| 3,995,124 | A | 11/1976 | Gabr |
| 4,025,721 | A | 5/1977 | Graupe et al. |
| 4,038,536 | A | 7/1977 | Feintuch |
| 4,052,559 | A | 10/1977 | Paul et al. |
| 4,088,834 | A | 5/1978 | Thurmond |
| 4,122,303 | A | 10/1978 | Chaplin et al. |

(Continued)

FOREIGN PATENT DOCUMENTS

| | | |
|---|---|---|
| CH | 653508 | 12/1985 |
| DE | 19748079 | 5/1999 |

(Continued)

OTHER PUBLICATIONS

"Advance Adaptive Feedback Cancellation", IntriCon: Technology White Paper, [Online]. Retrieved from the Internet: <URL: http://www.intricondownloads.com/D1/techdemo/WP_Advanced AFC_rev101006.pdf>, (Oct. 10, 2005), 3 pgs.

(Continued)

*Primary Examiner* — Eugene Lee
*Assistant Examiner* — Fang-Xing Jiang
(74) *Attorney, Agent, or Firm* — Schwegman, Lundberg & Woessner, P.A.

(57) ABSTRACT

A method for processing signals including an input, an output and a signal processor, comprising detecting a first periodic signal received at an input, adjusting frequency or phase of the first periodic signal in response to detecting the first periodic signal, comparing an amplitude of the first periodic signal before adjusting the frequency or phase to the amplitude after adjusting the frequency or phase to produce a first amplitude change and determining whether the first periodic signal is an acoustic feedback signal based on the first amplitude change. Apparatus including signal processing electronics to receive an input signal from a microphone and programmed to provide phase or frequency changes to signals in a processing channel and to detect periodic feedback signals based on the changes of signals in the processing channel, and a speaker. Variations include feedback reduction or cancellation systems and phase or frequency adjustment systems.

23 Claims, 8 Drawing Sheets

(56) References Cited

U.S. PATENT DOCUMENTS

| | | | | |
|---|---|---|---|---|
| 4,130,726 | A | 12/1978 | Kates et al. | |
| 4,131,760 | A | 12/1978 | Christensen et al. | |
| 4,185,168 | A | 1/1980 | Graupe et al. | |
| 4,187,413 | A | 2/1980 | Moser | |
| 4,188,667 | A | 2/1980 | Graupe et al. | |
| 4,232,192 | A | 11/1980 | Beex | |
| 4,238,746 | A | 12/1980 | McCool et al. | |
| 4,243,935 | A | 1/1981 | McCool et al. | |
| 4,366,349 | A | 12/1982 | Adelman | |
| 4,377,793 | A | 3/1983 | Horna | |
| 4,425,481 | A | 1/1984 | Mansgold et al. | |
| 4,471,171 | A | 9/1984 | Kopke et al. | |
| 4,485,272 | A | 11/1984 | Duong et al. | |
| 4,508,940 | A | 4/1985 | Steeger | |
| 4,548,082 | A | 10/1985 | Engebretson et al. | |
| 4,582,963 | A | 4/1986 | Danstrom | |
| 4,589,137 | A | 5/1986 | Miller | |
| 4,596,902 | A | 6/1986 | Gilman | |
| 4,622,440 | A | 11/1986 | Slavin | |
| 4,628,529 | A | 12/1986 | Borth et al. | |
| 4,630,305 | A | 12/1986 | Borth et al. | |
| 4,658,426 | A | 4/1987 | Chabries et al. | |
| 4,680,798 | A | 7/1987 | Neumann | |
| 4,731,850 | A | 3/1988 | Levitt et al. | |
| 4,751,738 | A | 6/1988 | Widrow et al. | |
| 4,771,396 | A | 9/1988 | South et al. | |
| 4,783,817 | A | 11/1988 | Hamada et al. | |
| 4,783,818 | A | 11/1988 | Graupe et al. | |
| 4,791,672 | A | 12/1988 | Nunley et al. | |
| 4,823,382 | A | 4/1989 | Martinez | |
| 4,879,749 | A | 11/1989 | Levitt et al. | |
| 4,972,482 | A | 11/1990 | Ishiguro et al. | |
| 4,972,487 | A | 11/1990 | Mangold et al. | |
| 4,989,251 | A | 1/1991 | Mangold | |
| 5,016,280 | A | 5/1991 | Engebretson et al. | |
| 5,091,952 | A | 2/1992 | Williamson et al. | |
| 5,170,434 | A * | 12/1992 | Anderson | 381/317 |
| 5,226,086 | A | 7/1993 | Platt | |
| 5,259,033 | A | 11/1993 | Goodings et al. | |
| 5,502,869 | A | 4/1996 | Smith et al. | |
| 5,533,120 | A | 7/1996 | Staudacher | |
| 5,606,620 | A | 2/1997 | Weinfurtner | |
| 5,619,580 | A | 4/1997 | Hansen | |
| 5,621,802 | A | 4/1997 | Harjani et al. | |
| 5,668,747 | A * | 9/1997 | Ohashi | 708/322 |
| 5,706,352 | A | 1/1998 | Engebretson et al. | |
| 5,724,433 | A | 3/1998 | Engebretson et al. | |
| 5,737,410 | A | 4/1998 | Vahatalo et al. | |
| 5,838,806 | A | 11/1998 | Sigwanz et al. | |
| 5,920,548 | A | 7/1999 | El Malki | |
| 5,987,146 | A | 11/1999 | Pluvinage et al. | |
| 5,991,419 | A | 11/1999 | Brander | |
| 6,035,050 | A | 3/2000 | Weinfurtner et al. | |
| 6,044,183 | A | 3/2000 | Pryor | |
| 6,173,063 | B1 | 1/2001 | Melanson | |
| 6,219,427 | B1 | 4/2001 | Kates et al. | |
| 6,240,192 | B1 | 5/2001 | Brennan et al. | |
| 6,275,596 | B1 | 8/2001 | Fretz et al. | |
| 6,389,440 | B1 | 5/2002 | Lewis et al. | |
| 6,434,247 | B1 | 8/2002 | Kates et al. | |
| 6,480,610 | B1 | 11/2002 | Fang et al. | |
| 6,498,858 | B2 | 12/2002 | Kates | |
| 6,552,446 | B1 | 4/2003 | Lomba et al. | |
| 6,718,301 | B1 | 4/2004 | Woods | |
| 6,876,751 | B1 | 4/2005 | Gao et al. | |
| 6,885,752 | B1 | 4/2005 | Chabries et al. | |
| 6,912,289 | B2 | 6/2005 | Vonlanthen et al. | |
| 6,928,160 | B2 | 8/2005 | Ebenezer et al. | |
| 7,006,646 | B1 | 2/2006 | Baechler | |
| 7,058,182 | B2 | 6/2006 | Kates | |
| 7,242,777 | B2 | 7/2007 | Leenen et al. | |
| 7,283,638 | B2 | 10/2007 | Troelsen et al. | |
| 7,283,842 | B2 | 10/2007 | Berg | |
| 7,292,699 | B2 | 11/2007 | Gao et al. | |
| 7,349,549 | B2 | 3/2008 | Bachler et al. | |
| 7,386,142 | B2 | 6/2008 | Kindred | |
| 7,519,193 | B2 | 4/2009 | Fretz | |
| 7,809,150 | B2 | 10/2010 | Natarajan et al. | |
| 7,889,879 | B2 | 2/2011 | Dillon et al. | |
| 8,116,473 | B2 * | 2/2012 | Salvetti et al. | 381/71.11 |
| 2001/0002930 | A1 | 6/2001 | Kates | |
| 2001/0055404 | A1 | 12/2001 | Bisgaard | |
| 2002/0025055 | A1 | 2/2002 | Stonikas et al. | |
| 2002/0051546 | A1 * | 5/2002 | Bizjak | 381/106 |
| 2002/0057814 | A1 * | 5/2002 | Kaulberg | 381/312 |
| 2002/0176584 | A1 | 11/2002 | Kates | |
| 2003/0007647 | A1 | 1/2003 | Nielsen et al. | |
| 2003/0026442 | A1 | 2/2003 | Fang et al. | |
| 2003/0112988 | A1 | 6/2003 | Naylor | |
| 2004/0066944 | A1 | 4/2004 | Leenen et al. | |
| 2004/0190739 | A1 | 9/2004 | Bachler et al. | |
| 2004/0202340 | A1 | 10/2004 | Armstrong et al. | |
| 2004/0218772 | A1 * | 11/2004 | Ryan | 381/328 |
| 2005/0036632 | A1 | 2/2005 | Natarajan et al. | |
| 2005/0047620 | A1 * | 3/2005 | Fretz | 381/318 |
| 2005/0069162 | A1 | 3/2005 | Haykin et al. | |
| 2005/0111683 | A1 | 5/2005 | Chabries et al. | |
| 2005/0129262 | A1 | 6/2005 | Dillon et al. | |
| 2005/0265568 | A1 | 12/2005 | Kindred | |
| 2005/0283263 | A1 | 12/2005 | Eaton et al. | |
| 2006/0222194 | A1 | 10/2006 | Bramslow | |
| 2006/0227987 | A1 | 10/2006 | Hasler | |
| 2007/0009123 | A1 | 1/2007 | Aschoff et al. | |
| 2007/0019817 | A1 | 1/2007 | Siltmann | |
| 2007/0020299 | A1 | 1/2007 | Pipkin et al. | |
| 2007/0036280 | A1 | 2/2007 | Roeck et al. | |
| 2007/0135862 | A1 | 6/2007 | Nicolai et al. | |
| 2007/0217620 | A1 | 9/2007 | Zhang et al. | |
| 2007/0217629 | A1 | 9/2007 | Zhang et al. | |
| 2007/0219784 | A1 | 9/2007 | Zhang et al. | |
| 2007/0223755 | A1 * | 9/2007 | Salvetti et al. | 381/318 |
| 2007/0237346 | A1 | 10/2007 | Fichtl et al. | |
| 2007/0276285 | A1 | 11/2007 | Burrows et al. | |
| 2007/0280487 | A1 | 12/2007 | Ura et al. | |
| 2008/0019547 | A1 | 1/2008 | Baechler | |
| 2008/0037798 | A1 | 2/2008 | Baechler et al. | |
| 2008/0107296 | A1 | 5/2008 | Bachler et al. | |
| 2008/0304684 | A1 | 12/2008 | Kindred | |
| 2009/0154741 | A1 | 6/2009 | Woods et al. | |
| 2009/0175474 | A1 * | 7/2009 | Salvetti et al. | 381/318 |
| 2011/0150231 | A1 | 6/2011 | Natarajan | |
| 2011/0249846 | A1 | 10/2011 | Natarajan | |
| 2011/0249847 | A1 | 10/2011 | Salvetti et al. | |

FOREIGN PATENT DOCUMENTS

| | | | |
|---|---|---|---|
| DE | 19748079 | A2 | 5/1999 |
| EP | 250679 | A2 | 1/1988 |
| EP | 0396831 | A2 | 11/1990 |
| EP | 250679 | B1 | 7/1993 |
| EP | 0335542 | B1 | 12/1994 |
| EP | 712263 | A1 | 5/1996 |
| EP | 712263 | B1 | 1/2003 |
| EP | 1256258 | B1 | 3/2005 |
| EP | 1538868 | A2 | 6/2005 |
| EP | 1718110 | A1 | 2/2006 |
| GB | 1356645 | | 6/1974 |
| JP | 59-64994 | | 4/1984 |
| JP | 60-31315 | | 2/1985 |
| WO | WO-0106746 | A2 | 1/2001 |
| WO | WO-0154456 | A1 | 7/2001 |
| WO | WO-03045108 | A2 | 5/2003 |
| WO | WO-03098970 | A1 | 11/2003 |
| WO | WO-2004105430 | A1 | 12/2004 |
| WO | WO-2005002433 | A1 | 1/2005 |
| WO | WO-2005018275 | A2 | 2/2005 |
| WO | WO-2007045276 | A1 | 4/2007 |
| WO | WO-2007112737 | A1 | 10/2007 |

OTHER PUBLICATIONS

"U.S. Appl. No. 10/854,922 Notice of Allowance mailed Nov. 19, 2007", 9 Pages.

(56) References Cited

OTHER PUBLICATIONS

"U.S. Appl. No. 10/857,599 Final Office Action mailed Jun. 11, 2009", 7 pgs.
"U.S. Appl. No. 10/857,599 Notice of Allowance mailed Jul. 26, 2010", 10 pgs.
"U.S. Appl. No. 10/857,599, Final Office Action Mailed Jul. 24, 2008", 9 pgs.
"U.S. Appl. No. 10/857,599, Non-Final Office Action mailed Jan. 26, 2010", 8 pgs.
"U.S. Appl. No. 10/857,599, Non-Final Office Action mailed Dec. 26, 2007", 8 pgs.
"U.S. Appl. No. 10/857,599, Non-Final Office Action mailed Dec. 31, 2008", 6 pgs.
"U.S. Appl. No. 10/857,599, Response filed Apr. 26, 2010 to Non Final Office Action mailed Jan. 26, 2010", 8 pgs.
"U.S. Appl. No. 10/857,599, Response filed Apr. 28, 2008 to Non-Final Office Action mailed Dec. 26, 2007", 7 pgs.
"U.S. Appl. No. 10/857,599, Response filed Apr. 30, 2009 to Non-Final Office Action mailed Dec. 31, 2008", 7 pgs.
"U.S. Appl. No. 10/857,599, Response filed Nov. 12, 2009 to Final Office Action mailed Jun. 11, 2009", 9 pgs.
"U.S. Appl. No. 10/857,599, Response filed Nov. 16, 2007 to Restriction Requirement dated May 21, 2007", 6 pgs.
"U.S. Appl. No. 10/857,599, Response filed Nov. 24, 2008 to Final Office Action mailed Jul. 24, 2008", 9 pgs.
"U.S. Appl. No. 10/857,599, Restriction Requirement mailed May 21, 2007", 5 pgs.
"U.S. Appl. No. 11/276,763 Final Office Action mailed Sep. 14, 2010", 9 Pgs.
"U.S. Appl. No. 11/276,763, Non-Final Office Action mailed Apr. 2, 2010", 11 pgs.
"U.S. Appl. No. 11/276,763, Response filed Jan. 11, 2010 to Restriction Requirement mailed Dec. 10, 2009", 9 pgs.
"U.S. Appl. No. 11/276,763, Response filed Jul. 2, 2010 to Non Final Office Action mailed Apr. 2, 2010", 15 pgs.
"U.S. Appl. No. 11/276,763, Restriction Requirement mailed Dec. 10, 2009", 6 pgs.
"U.S. Appl. No. 11/276,793, Non-Final Office Action mailed May 12, 2009", 20 pgs.
"U.S. Appl. No. 11/276,793, Response filed Nov. 11, 2009 to Non Final Office Action mailed May 12, 2009", 16 pgs.
"U.S. Appl. No. 11/276,795, Advisory Action mailed Jan. 12, 2010", 13 pgs.
"U.S. Appl. No. 11/276,795, Decision on Pre-Appeal Brief Request mailed Apr. 14, 2010", 2 pgs.
"U.S. Appl. No. 11/276,795, Examiner Interview Summary filed Mar. 11, 2011", 1 pg.
"U.S. Appl. No. 11/276,795, Examiner Interview Summary mailed Feb. 9, 2011", 3 pgs.
"U.S. Appl. No. 11/276,795, Final Office Action mailed Oct. 14, 2009", 15 pgs.
"U.S. Appl. No. 11/276,795, Final Office Action mailed Nov. 24, 2010", 17 pgs.
"U.S. Appl. No. 11/276,795, Non Final Office Action mailed May 7, 2009", 13 pgs.
"U.S. Appl. No. 11/276,795, Non-Final Office Action mailed May 27, 2010", 14 pgs.
"U.S. Appl. No. 11/276,795, Notice of Allowance mailed Mar. 18, 2011", 12 pgs.
"U.S. Appl. No. 11/276,795, Pre-Appeal Brief Request mailed Feb. 16, 2010", 4 pgs.
"U.S. Appl. No. 11/276,795, Response filed Jan. 24, 2011 to Final Office Action mailed Nov. 24, 2010", 11 pgs.
"U.S. Appl. No. 11/276,795, Response filed Sep. 8, 2009 to Non-Final Office Action mailed May 7, 2009", 10 pgs.
"U.S. Appl. No. 11/276,795, Response filed Sep. 28, 2010 to Non Final Office Action mailed May 27, 2010", 6 pgs.
"U.S. Appl. No. 11/276,795, Response filed Dec. 14, 2009 to Final Office Action mailed Oct. 14, 2009", 10 pgs.
"U.S. Appl. No. 12/135,856 Non-Final Office Action mailed Sep. 23, 2010", 8 Pgs.
"U.S. Appl. No. 12/135,856, Notice of Allowance mailed Mar. 11, 2011", 9 pgs.
"U.S. Appl. No. 12/135,856, Response filed Dec. 23, 2010 to Non Final Office Action mailed Sep. 23, 2010", 10 pgs.
"Entrainment (Physics)", [Online]. Retrieved from the Internet: <URL: http://en.wikipedia.org/w/index.php?title=Entrainment_(physics)&printable=yes>, (Apr. 25, 2009), 2 pgs.
"European Application Serial No. 07250899.7, European Search Report mailed May 15, 2008", 7 pgs.
"European Application Serial No. 07250899.7, Office Action Mailed Jan. 15, 2009", 1 pgs.
"European Application Serial No. 07250899.7, Response to Official Communication Filed Jul. 13, 2009", 17 pgs.
"European Application Serial No. 07250920, Extended European Search Report mailed May 11, 2007", 6 pgs.
"European Application Serial No. 08253924.8, Search Report mailed on Jul. 1, 2009", 8 pgs.
"European Application Serial No. 09250817.5, Extended European Search Report mailed Nov. 18, 2010", 7 pgs.
"Inspiria Ultimate—GA3285", [Online]. Retrieved from the Internet: <URL: http://www.sounddesigntechnologies.com/products_InspiriaUltimate.php>, (Jun. 18, 2009), 4 pgs.
Anderson, D. B., "Noise Reduction in Speech Signals Using Pre-Whitening and the Leaky Weight Adaptive Line Enhancer", (Project Report presented to the Department of Electrical Engineering, Brigham Young University), (Feb. 1981), 56 pgs.
Best, L. C., "Digital Suppression of Acoustic Feedback in Hearing Aids", Thesis, Department of Electrical Engineering and the Graduate School of the University of Wyoming, (May, 1985), 66 pgs.
Boll, Steven F., "Suppression of Acoustic Noise in Speech Using Spectral Subtraction", IEEE Transactions on Acoustics, Speech, and Signal Processing, vol. ASSP-27, (Apr. 1979), 113-120.
Bustamante, D. K., et al., "Measurement and Adaptive Suppression of Acoustic Feedback in Hearing Aids", 1989 International Conference on Acoustics, Speech, and Signal Processing, 1989. ICASSP-89., (1989), 2017-2020.
Chabries, D. M., et al., "A General Frequency-Domain LMS Adaptive Algorithm", IEEE Transactions on Acoustics, Speech, and Signal Processing, (Aug. 1984), 6 pgs.
Chazan, D., et al., "Noise Cancellation for Hearing Aids", IEEE International Conference on ICASSP '86. Acoustics, Speech, and Signal Processing OTI 000251-255, (Apr. 1986), 977-980.
Christiansen, R. W., "A Frequency Domain Digital Hearing Aid", 1986 IEEE ASSP Workshop on Applications of Signal Processing to Audio and Acoustics, IEEE Acoustics, Speech, and Signal Processing Society, (1986), 4 pgs.
Christiansen, R. W., et al., "Noise Reduction in Speech Using Adaptive Filtering I: Signal Processing Algorithms", Proceedings, 103rd Conference of Acoustical Society of America, (Apr. 1982), 7 pgs.
Egolf, D. P., et al., "The Hearing Aid Feedback Path: Mathematical Simulations and Experimental Verification", J. Acoust. Soc. Am., 78(5), (1985), 1576-1587.
Kaneda, Y., et al., "Noise suppression. signal processing using 2-point received signals", Electronics and Communications in Japan, 67-A(12), (1984), 19-28.
Levitt, H., "A Cancellation Technique for the Amplitude and Phase Calibration of Hearing Aids and Nonconventional Transducers", Journal of Rehabilitation Research, 24(4), (1987), 261-270.
Levitt, H., et al., "A Digital Master Hearing Aid", Journal of Rehabilitation Research and Development, 23(1), (1986), 79-87.
Levitt, H., et al., "A Historical Perspective on Digital Hearing Aids: How Digital Technology has Changed Modern Hearing Aids", Trends in Amplification, 11(1), (Mar. 2007), 7-24.
Levitt, H., "Chapt. 6: Education of the Hearing Impaired Child", Technology and the Education of the Hearing Impaired, College-Hill Press, (Mar. 1985).
Maxwell, J. A., et al., "Reducing Acoustic Feedback in Hearing Aids", IEEE Transactions on Speech and Audio Processing, 3(4), (Jul. 1995), 304-313.

(56) References Cited

OTHER PUBLICATIONS

McAulay, R., et al., "Speech enhancement using a soft-decision noise suppression filter", IEEE Transactions on Acoustics, Speech, and Signal Processing [see also IEEE Transactions on Signal Processing], 28(2), (Apr. 1980), 137-145.
Mueller, Gustav H, "Data logging: Its popular, but how can this feature be used to help patients?", The Hearing Journal vol. 60, No. 10,, XP002528491, (Oct. 2007), 6 pgs.
Paul, Embree, "C algorithms for real-time DSP", Library of Congress Cataloging-In-Publication Data, Prentice Hall PTR, (1995), 98-113, 134-137, 228-233, 147.
Paul, Embree, "C++ Alogrithms for Digital Signal Processing", Prentice Hall PTR, (1999), 313-320.
Preves, D. A., "Evaluation of Phase Compensation for Enhancing the Signal Processing Capabilities of Hearing Aids in Situ", Thesis, Graduate School of the University of Minnesota, (Oct. 1985), 203 pgs.
Preves, David A., "Field Trial Evaluations of a Switched Directional/Omnidirectional In-the-Ear Hearing Instrument", Journal of the American Academy of Audiology, 10(5), (May 1999), 273-283.
Rife, D., et al., "Transfer-Function Measurement With Maximum-Length Sequences", J. Audio Eng. Soc., 37(6), (1989), 419-444.
Rosenberger, J. R., et al., "Performance of an Adaptive Echo Canceller Operating in a Noisy, Linear, Time-Invariant Environment", The Bell System Technical Journal, 50(3), (1971), 785-813.
Saeed, V. Vaseghi, "Echo Cancellation", Advanced Digital Signal Processing and Noise Reduction, Second Edition., John Wiley & Sons, (2000), 397-404.
South, C. R., et al., "Adaptive Filters to Improve Loudspeaker Telephone", Electronics Letters,15(21), (1979), 673-674.
Weaver, K. A., "An Adaptive Open-Loop Estimator for the Reduction of Acoustic Feedback", Thesis, Department of Electrical Engineering and The Graduate School of the University of Wyoming, (Dec. 1984), 70 pgs.
Weaver, K. A., et al., "Electronic Cancellation of Acoustic Feedback to Increase Hearing-Aid Stability", The Journal of the Acoustical Society of America, vol. 77, Issue S1, 109th Meeting, Acoustical Society of America, (Apr. 1985), p. S105.
Widrow, B, et al., "Stationary and nonstationary learning characteristics of the LMS adaptive filter", Proceedings of the IEEE, 64(8), (Aug. 1976), 1151-1162.
Widrow, B., et al., "Adaptive Antenna Systems", Proceedings of the IEEE, 55(12), (Dec. 1967), 2143-2159.
Widrow, B., et al., "Adaptive Noise Cancelling: Principles and Applications", Proceedings of the IEEE, 63(12), (1975), 1692-1716.
Wreschner, M. S., et al., "A Microprocessor Based System for Adaptive Hearing Aids", 1985 ASEE Annual Conference Proceedings, (1985), 688-691.
"U.S. Appl. No. 12/644,932, Non Final Office Action mailed Dec. 29, 2011", 14 pgs.
"European Application Serial No. 09250817.5, Response filed Jun. 22, 2011 to Extended European Search Report mailed Nov. 18, 2010", 25 pgs.
"U.S. Appl. No. 12/644,932, Response filed Jun. 28, 2012 to Non Final Office Action mailed Dec. 29, 2011", 12 pgs.
Taylor, Jennifer Suzanne, "Subjective versus objective measures of daily listening environments", Independent Studies and Capstones. Paper 492. Program in Audiology and Communication Sciences, Washington University School of Medicine., http://digitalcommons.wustl.edu/pacs_capstones/492, (2007), 50 pgs.

* cited by examiner

APPARATUS AND METHOD FOR DYNAMIC DETECTION AND ATTENUATION OF PERIODIC ACOUSTIC FEEDBACK

CLAIM OF PRIORITY

The present application claims the benefit under 35 U.S.C. 119(e) of U.S. Provisional Patent Application Ser. No. 61/039,355, filed Mar. 25, 2008, which is incorporated herein by reference in its entirety.

TECHNICAL FIELD

This application relates generally to audio processors and, more particularly, to audio processors with acoustic feedback detection and attenuation for periodic feedback signals.

BACKGROUND

An audio processing system such as a public address system or a hearing aid system compromises a microphone, an audio processing unit and a speaker (receiver in the case of a hearing aid). In the ideal audio processing system, the audio signal would flow in only a forward direction: from the audio source, to the microphone, to the audio processing unit, to the speaker (receiver), to the target eardrum.

In a non-ideal audio processing system, part of the acoustic audio signal generated by the speaker (receiver) returns back to the microphone. This phenomenon is called audio feedback, and the physical path that brings the receiver signal back to the microphone is usually known as an acoustic feedback path or leakage path.

The re-entry of the audio signal through the feedback path can cause artifacts that can vary from "voice in a pipe" effect, to ringing, to sustained oscillation (whistling or howling), which can cause discomfort to the listener, and may render the system unusable.

Oscillation due to feedback generates audible periodic signals, including audible tones, and audible signals with periodic components. At first glance, a simple periodic signal detector could be used to detect periodic feedback signals. However, there are several audio sources in the environment which generate tones and periodic signals, such as appliance alarms, phones and musical instruments, to name a few. Therefore, it is highly desirable to have a audio processing system that can make a distinction between an periodic environment signals and a legitimate periodic feedback signal such that the system can attenuate only legitimate feedback signals.

SUMMARY

This document provides method and device apparatus for detection and attenuation of periodic feedback signals. One embodiment of the present subject matter includes detecting a first periodic signal received at an input of an audio system, adjusting a frequency of the first periodic signal in response to detecting the first periodic signal, comparing an amplitude of the first periodic signal before adjusting the frequency to an amplitude after adjusting the frequency to determine a first amplitude change and determining whether the first periodic signal is a periodic feedback signal based on the first amplitude change. Various embodiments employ different frequency shifting methods. Various embodiments offer feedback reduction or cancellation methods.

One embodiment of the present subject matter includes detecting a first periodic signal received at an input of an audio system, adjusting a phase of the first periodic signal in response to detecting the first periodic signal, comparing an amplitude of the first periodic signal before adjusting the phase to an amplitude after adjusting the frequency to determine a first amplitude change and determining whether the first periodic signal is a periodic feedback signal based on the first amplitude change. Various embodiments employ different phase shifting methods. Various embodiments offer feedback reduction or cancellation methods.

One embodiment of the present subject matter provide a hearing assistance device comprising a microphone to receive sound and provide an input signal, signal processing electronics to receive the input signal, the signal processing electronics programmed to provide phase or frequency changes to signals in a processing channel and to detect periodic feedback signals based on the phase or frequency changes of signals in the processing channel, and a speaker in communication with signal processing electronics. Various embodiments provide for a digital signal processor programmed to include a periodic signal detector adapted to detect a first periodic signal in the processing channel and a signal adjuster in communication with the periodic signal detector adapted to programmably adjust phase or frequency of signals in the processing channel. Various embodiments offer feedback reduction or cancellation apparatus.

This Summary is an overview of some of the teachings of the present application and is not intended to be an exclusive or exhaustive treatment of the present subject matter. Further details about the present subject matter are found in the detailed description and the appended claims. The scope of the present invention is defined by the appended claims and their legal equivalents.

DETAILED DESCRIPTION

The following detailed description of the present invention refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

Figure 1:
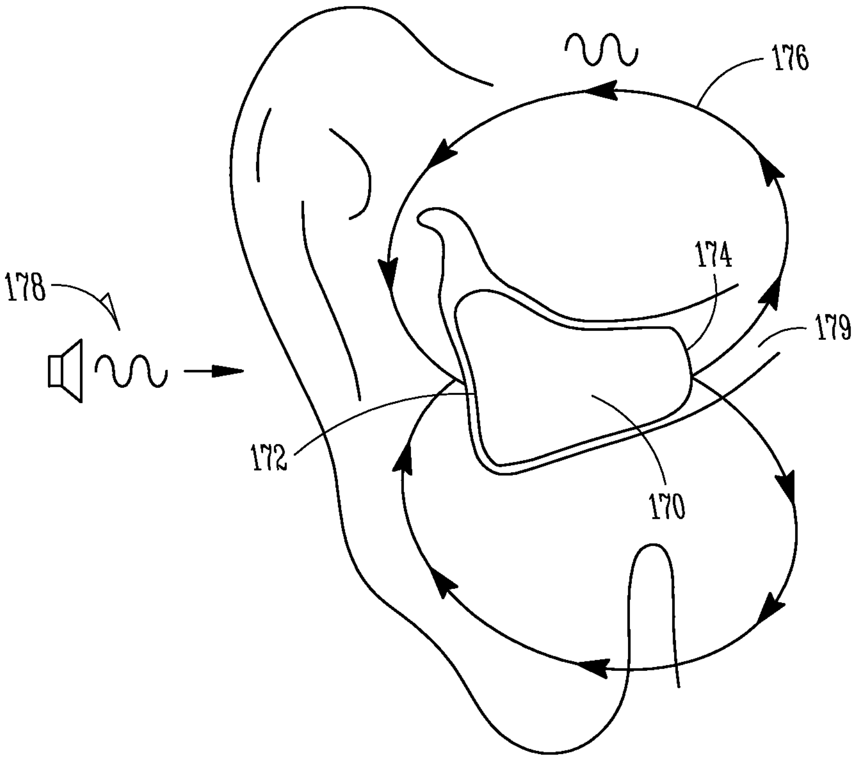
FIG. 1 illustrates one embodiment of a hearing assistance device according to the present subject matter.

FIG. 1 illustrates a hearing assistance device according to one embodiment of the present subject matter. The illustrated hearing assistance device 170 includes a housing worn in the ear canal 179 of a user. The housing encloses a microphone 172, processing electronics and a speaker 174. Sound received using the microphone is converted to an electrical signal, processed by the processing electronics and converted back to sound when broadcast into the user's ear canal using the speaker. Sound emitted from the speaker can follow acoustically conducive paths 176 back to the microphone 172 of the hearing assistance device 170. The resulting "feedback" signal can include periodic components that establish an annoying tonal sound to the wearer's ear. The illustrated embodiment also shows an environmental sound source 178 capable of emitting a periodic signal. For example, the sound source may be an alarm. The processing electronics of the illustrated hearing assistance device detects both the feedback periodic signal and the environmental signal and determines whether each signal is feedback. The processing electronics subsequently attenuates the periodic feedback signal and transmits the periodic environmental signal to the speaker.

Figure 2:
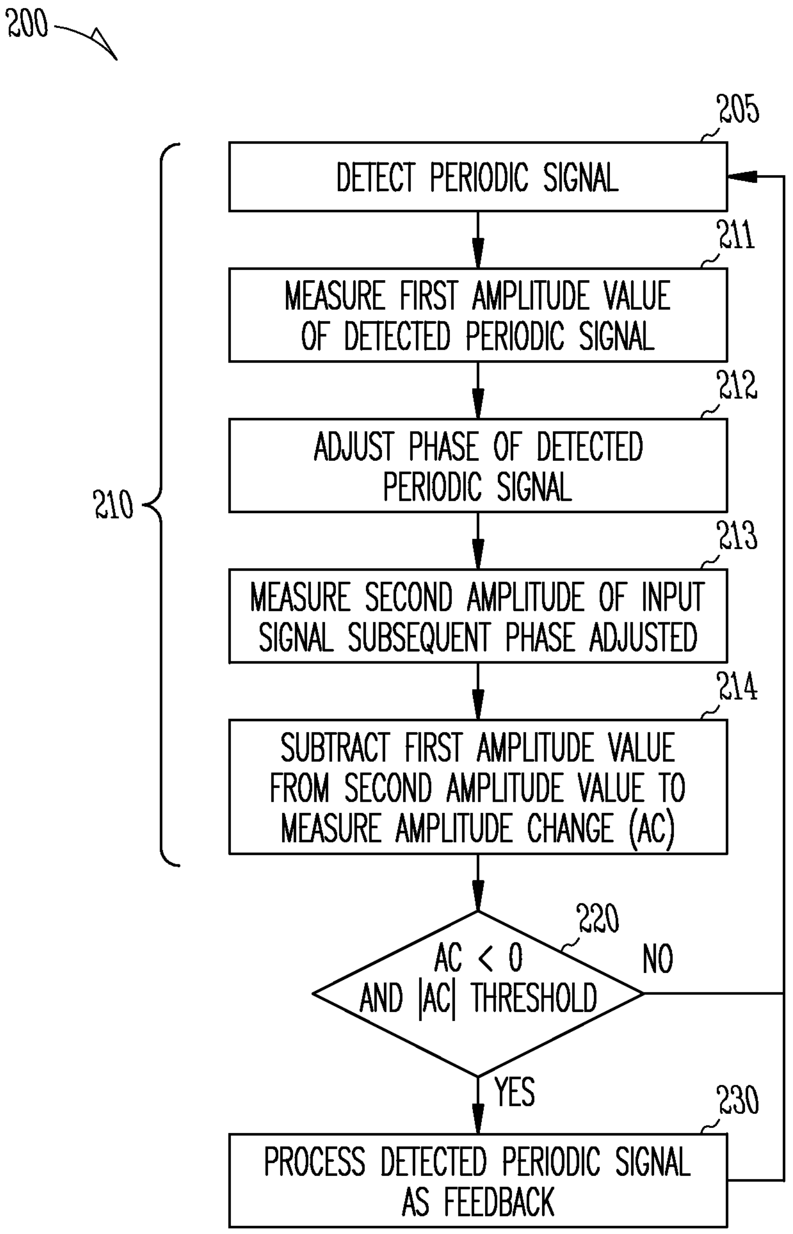
FIG. 2 illustrates a flow diagram of a dynamic periodic feedback signal detection and attenuation method according to one embodiment of the present subject matter.

FIG. 2 illustrates a flow diagram 200 of a dynamic periodic feedback signal detection and attenuation method according to one embodiment of the present subject matter. The method includes detecting a periodic input signal 205, processing the detected periodic input signal 210, determining if the detected periodic signal is feedback 220 and if determined to be feedback, processing the input periodic signal as feedback 230. In the illustrated embodiment, processing the detected periodic signal 210 includes measuring a first amplitude value of a detected periodic signal 211, adjusting the phase of the signal for output from the hearing assistance device 212, measuring a second amplitude value of a detected phase adjusted signal 213 and subtracting the first amplitude value from the second amplitude value to measure an amplitude change between the signals 214. The amplitude change value is subsequently used to determine if the detected periodic signal is an environmental signal or a feedback signal 220. The illustrated method includes evaluating the magnitude and polarity of the measured amplitude change between the detected signal and the modified signal. A detected periodic signal will be named a feedback signal if the measured amplitude change from either the phase adjustment is negative and the magnitude of the change exceeds a threshold 220. If the measured magnitude change is positive, or negative and the magnitude is less then the threshold, the detected signal is named a environmental signal and processed as an environmental signal. In various embodiments, a signal named a feedback signal is processed as a feedback signal 230. In various embodiments, processing the periodic input signal includes determining if the phase had previously been adjusted, and if so, adjusting the phase further. In various embodiments, the processing the signal is repeated a number of times and the results are evaluated to eliminate false determinations of periodic signal feedback.

In various embodiments, different systems are employed to process the detected signal as feedback. In one embodiment, a feedback canceller is employed which provides reduction of acoustic feedback. Various types of acoustic feedback cancellers include, but are not limited to adaptive filters, such as LMS adaptive filters, N-LMS adaptive filters, Filtered-X LMS adaptive filters, Recursive Least Squares adaptive filters, phase cancellation and phase management, heuristic based feedback management, or any other system that uses correlation, prediction, and/or optimization to estimate and reduce feedback that operates in the time domain or any other signal decomposition domain using both linear or non-linear transformations. In one embodiment, a feedback canceller is employed and its adaptation rate is adjusted to provide reduction of acoustic feedback. In one embodiment, a frequency band in which the acoustic feedback is detected is attenuated to provide reduction of acoustic feedback. Such embodiments may be conducted in subband processing models that allow for the attenuation of one or more subbands. In one embodiment, a notch filter is adjusted which is used to reduce acoustic feedback within the frequency region of the notch. Other attenuation methods include, but are not limited to shifting the phase and/or frequency of the output or modifying the amount of shift by using either a deterministic or random method, such that it breaks the feedback regenerative loop. Such output phase shifting systems include, but are not limited to, the output phase modulation system described in U.S. patent application Ser. No. 11/276,763 which was filed on Mar. 13, 2006, and is hereby incorporated by reference in its entirety. Other acoustic feedback systems may be employed without departing from the scope of the present subject matter.

Figure 3:
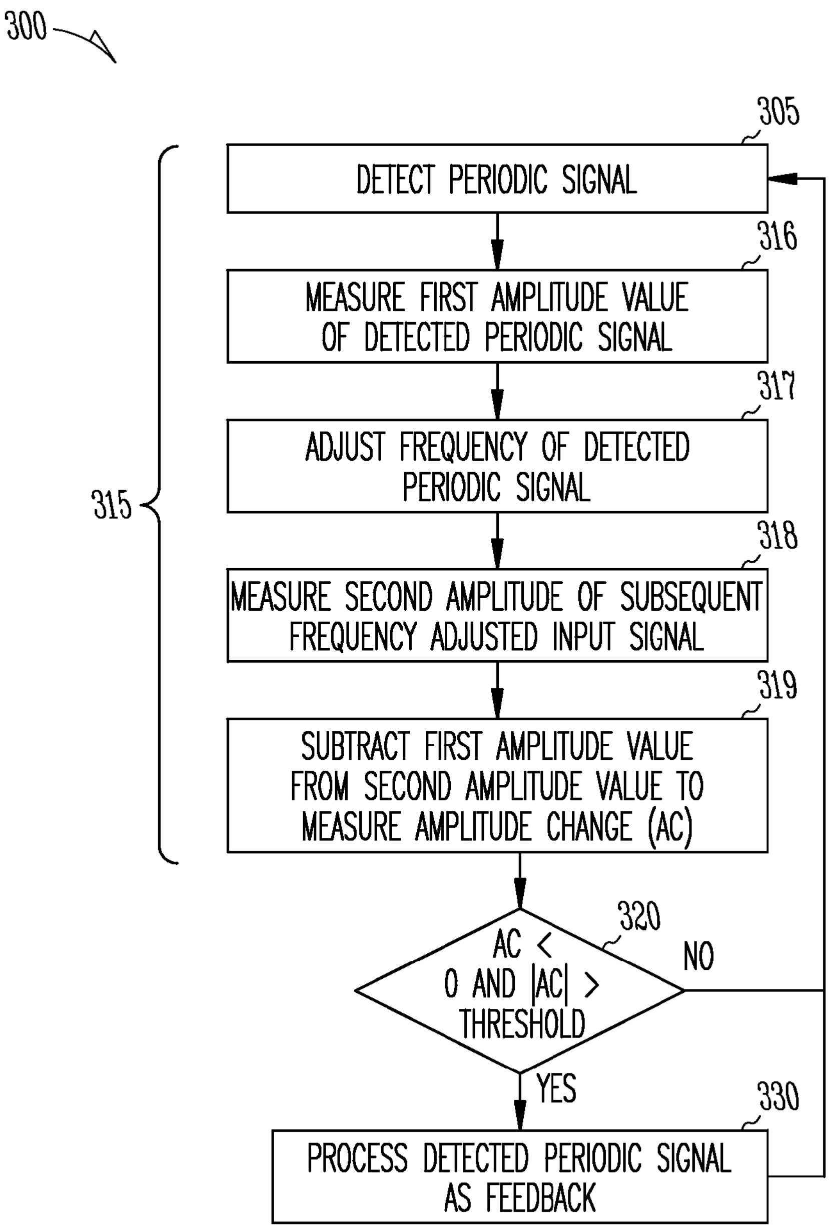
FIG. 3 illustrates a flow diagram of a dynamic periodic feedback signal detection and attenuation method according to one embodiment of the present subject matter.

FIG. 3 illustrates a flow diagram 300 of a dynamic periodic feedback signal detection and attenuation method according to one embodiment of the present subject matter. The method includes detecting a periodic input signal 305, processing the detected periodic input signal 315, determining if the detected periodic signal is feedback 320 and if determined to be feedback, processing the input periodic signal as feedback 330. In the illustrated embodiment, processing the detected periodic signal 315 includes measuring a first amplitude value of the signal 316, adjusting the frequency of the signal for output from the hearing assistance device 317, measuring a second amplitude value of a detected frequency adjusted signal 318 and subtracting the first amplitude value from the second amplitude value to measure an amplitude change between the signals 319. The amplitude change value is subsequently used to determine if the detected periodic signal is an environmental signal or a feedback signal. The illustrated method includes evaluating the magnitude and polarity of the measured amplitude change between the detected signal and the modified signal 320. A detected periodic signal will be named a feedback signal if the measured amplitude change from either the frequency adjustment is negative and the magnitude of the change exceeds a threshold 320. If the measured magnitude change is positive, or negative and the magnitude is less then the threshold, the detected signal is named a environmental signal and processed as an environmental signal. In various embodiments, a signal named a feedback signal is processed as a feedback signal 230. In various embodiments, processing the periodic input signal includes determining if the phase had previously been adjusted, and if so, adjusting the phase further. In various embodiments, the processing the signal is repeated a number of times and the results are evaluated to eliminate false determinations of periodic signal feedback.

In various embodiments, different systems are employed to process the detected signal as feedback. In one embodiment, a feedback canceller is employed which provides reduction of acoustic feedback. Various types of acoustic feedback cancellers include, but are not limited to adaptive filters, such as LMS adaptive filters N-LMS adaptive filters, Filtered-X LMS adaptive filters, Recursive Least Squares adaptive filters, phase cancellation and phase management, heuristic based feedback management, or any other system that uses correlation, prediction, and/or optimization to estimate and reduce feedback that operates in the time domain or any other signal decomposition domain using both linear or non-linear transformations. In one embodiment, a feedback canceller is employed and its adaptation rate is adjusted to provide reduction of acoustic feedback. In one embodiment, a frequency band in which the acoustic feedback is detected is attenuated to provide reduction of acoustic feedback. Such embodiments may be conducted in subband processing models that allow for the attenuation of one or more subbands. In one embodiment, a notch filter is adjusted which is used to reduce acoustic feedback within the frequency region of the notch. Other attenuation methods include, but are not limited to shifting the phase and/or frequency of the output or modifying the amount of shift by using either a deterministic or random method, such that it breaks the feedback regenerative loop.

Figure 4:
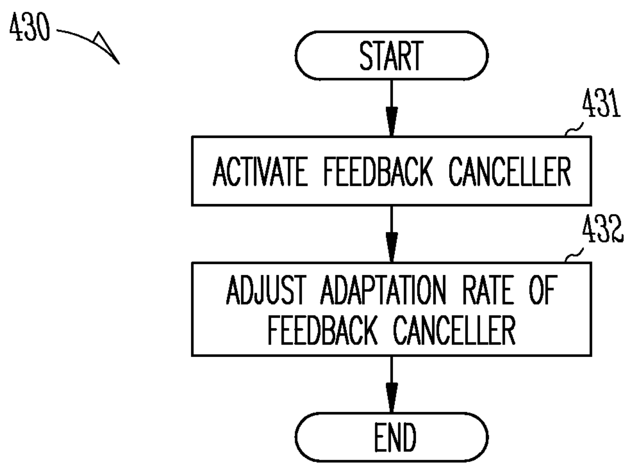
FIG. 4 illustrates a flow diagram for processing a signal as a feedback signal according to one embodiment of the present subject matter.

FIG. 4 illustrates a flow diagram 430 for processing a signal as a feedback signal according to one embodiment of the present subject matter. The method of FIG. 4 includes activating a feedback cancellation filter 431 upon determining a detected periodic signal is a feedback signal. In various embodiments, the feedback cancellation filter includes an adaptive filter and the method includes adjusting an adaptation rate 432 of the filter to cancel the detected periodic signal.

Figure 5:
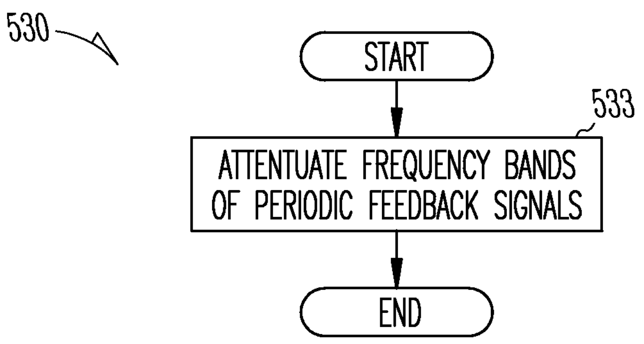
FIG. 5 illustrates a flow diagram for processing a signal as a feedback signal according to one embodiment of the present subject matter.

FIG. 5 illustrates a flow diagram 530 for processing a signal as a feedback signal according to one embodiment of the present subject matter. The method of FIG. 5 includes attenuating one or more frequency bands associated with the detected periodic signal 533.

Figure 6:
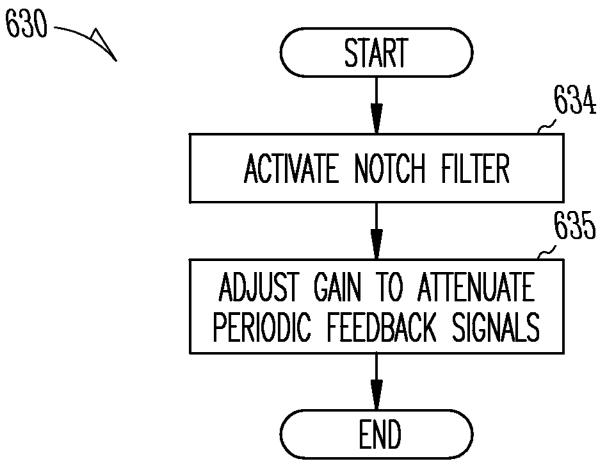
FIG. 6 illustrates a flow diagram for processing a signal as a feedback signal according to one embodiment of the present subject matter.

FIG. 6 illustrates a flow diagram 630 for processing a signal as a feedback signal according to one embodiment of the present subject matter. The method of FIG. 6 includes activating one or more notch filters to attenuate the detected periodic feedback signal 634. In various embodiments, the method also includes programmatically adjusting the gain of one or more notch filters 635 to attenuate the detected periodic signal.

Figure 7A:
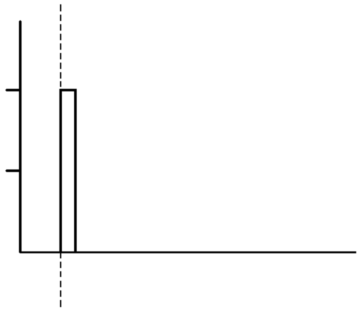
FIGS. 7A-7D illustrate signal morphology encountered using a method according to the present subject matter.
Figure 7B:
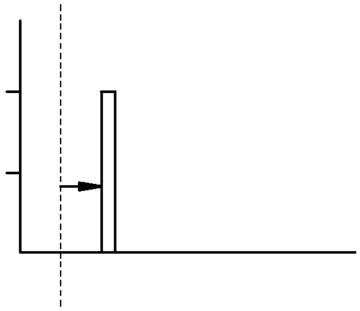
Figure 7C:
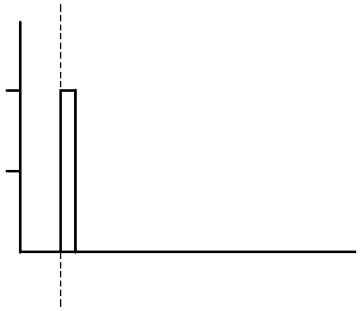
Figure 7D:
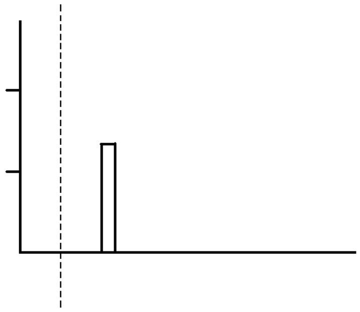

FIGS. 7A-7D illustrate signal morphology encountered using a method according to the present subject matter. FIG. 7A illustrates a typical periodic signal input. FIG. 7B illustrates a processed signal generated using a method according to one embodiment of the present subject matter. The illustrated signal has been processed so as to shift the frequency of the periodic input signal. FIGS. 7C and 7D show an input signal encountered after processing the initial input signal according to the present subject matter. FIG. 7C shows the delayed input signal that looks identical to the initial input signal, in that the signal's amplitude and frequency correspond strongly to the original signal. Upon measuring and comparing the delayed signal of FIG. 7C with the signal of FIG. 7A, a method according to the present subject matter would name the initial signal a periodic environmental signal. FIG. 7D shows the delayed input signal that does not correspond to the initial signal but shows a received signal with substantial attenuation as well as frequency shift corresponding to the processed signal. Upon measuring and comparing the delayed signal of FIG. 7D with the signal of FIG. 7A, a method according to the present subject matter would name the initial signal a periodic feedback signal and take further steps to attenuate the initial periodic signal of FIG. 7A or assist in attenuating, including eliminating, the initial periodic signal.

Figure 8:
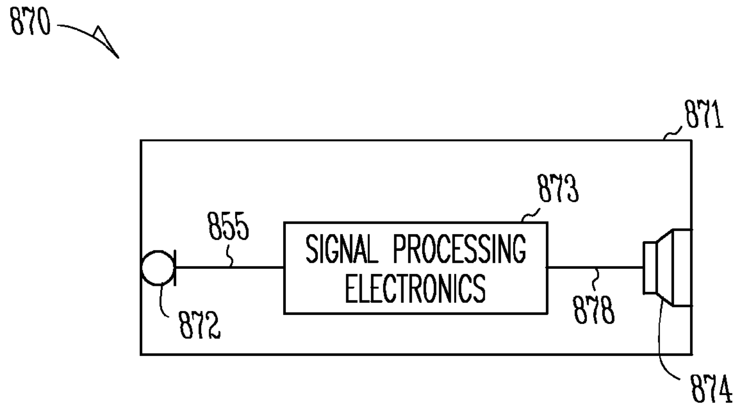
FIG. 8 illustrates a hearing assistance device according to one embodiment of the present subject matter.

FIG. 8 illustrates a hearing assistance device according to one embodiment of the present subject matter. The hearing assistance device 870 includes a housing 871, a microphone 872 to receive sound and convert the sound to a input sound signal 855, signal processing electronics 873 to process the input sound signal and a speaker 874 to broadcast the processed sound signal 878. In various embodiments, the signal processing electronics 873 are programmed to detect periodic signals within the incoming sound signal, adjust the periodic signals, subsequently process the adjusted periodic signal, determine if a detected periodic signal is a feedback signal and, if so, attenuate the periodic feedback signal. In various embodiments, the signal processing electronics 873 also includes programming to process received sound signals to assist a user with hearing. In various embodiments, the processing electronics 873 are implemented using a digital signal processor (DSP). In various embodiments, the signal processing electronics 873 include one or more microprocessors. In various embodiments, the housing 871 is a behind-the-ear (BTE) housing. In various embodiments, the housing 871 is a in-the-ear (ITE) housing. In various embodiments, the housing 871 is a in-the-canal (ITC) housing. In various embodiments, the housing 871 is a completely-in-the-canal (CIC) housing.

Figure 9A:
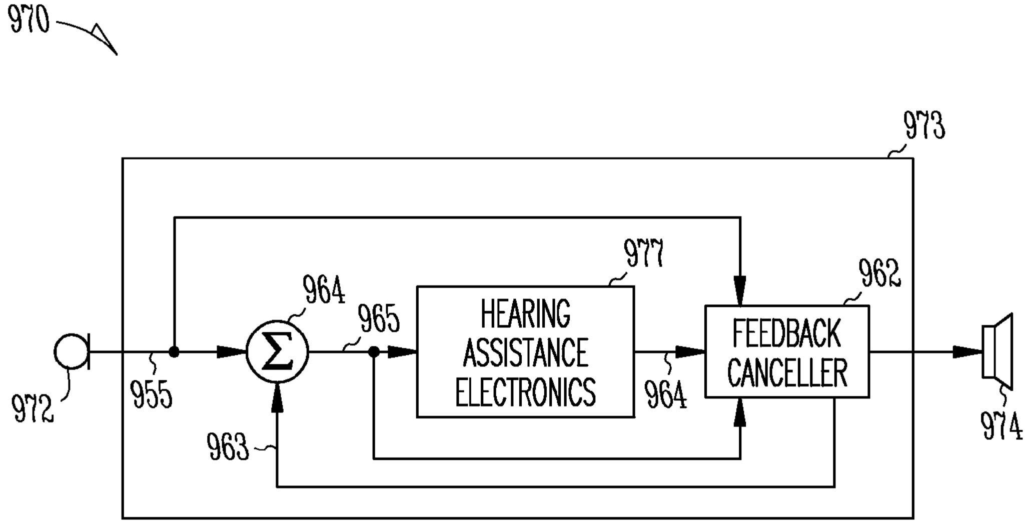
FIGS. 9A and 9B illustrate a hearing assistance device according to one embodiment of the present subject matter.

FIG. 9A shows a hearing assistance device 970 according to one embodiment of the current subject matter. The illustrated embodiment includes a microphone 972 for receiving sound and converting the sound to an electrical acoustic signal, signal processing electronics 973, including hearing assistance electronics 977, for processing the acoustic signal and a speaker 974 for emitting the processed signal as sound for to a user. The signal processing electronics 973 of the illustrated embodiment include a feedback canceller 962 for, among other things, detecting and attenuating feedback signals similar to environmental periodic signals. In the illustrated embodiment, the feedback canceller 962 generates a feedback cancellation signal 963. The feedback cancellation signal 963 is combined at a summing junction 964 with the acoustic signal 955 received using the microphone 972. In various embodiments, the feedback canceller 962 generates the feedback cancellation signal 963 using signal information, including signal information about the signal 955 received using the microphone 972, the processed signal 964 generated using the hearing assistance electronics 977 and the composite signal 965 generated at the summing junction 964.

In one embodiment, the feedback canceller 962 provides reduction of acoustic feedback. Various types of acoustic feedback cancellers include, but are not limited to adaptive filters, such as LMS adaptive filters N-LMS adaptive filters, Filtered-X LMS adaptive filters, Recursive Least Squares adaptive filters, phase cancellation and phase management, heuristic based feedback management, or any other system that uses correlation, prediction, and/or optimization to estimate and reduce feedback that operates in the time domain or any other signal decomposition domain using both linear or non-linear transformations. In one embodiment, a feedback canceller 962 is employed and its adaptation rate is adjusted to provide reduction of acoustic feedback. In one embodiment, a frequency band in which the acoustic feedback is detected is attenuated to provide reduction of acoustic feedback. Such embodiments may be conducted in subband processing models that allow for the attenuation of one or more subbands. In one embodiment, a notch filter is adjusted which is used to reduce acoustic feedback within the frequency region of the notch. Other attenuation methods include, but are not limited to shifting the phase and/or frequency of the output or modifying the amount of shift by using either a deterministic or random method, such that it breaks the feedback regenerative loop.

Figure 9B:
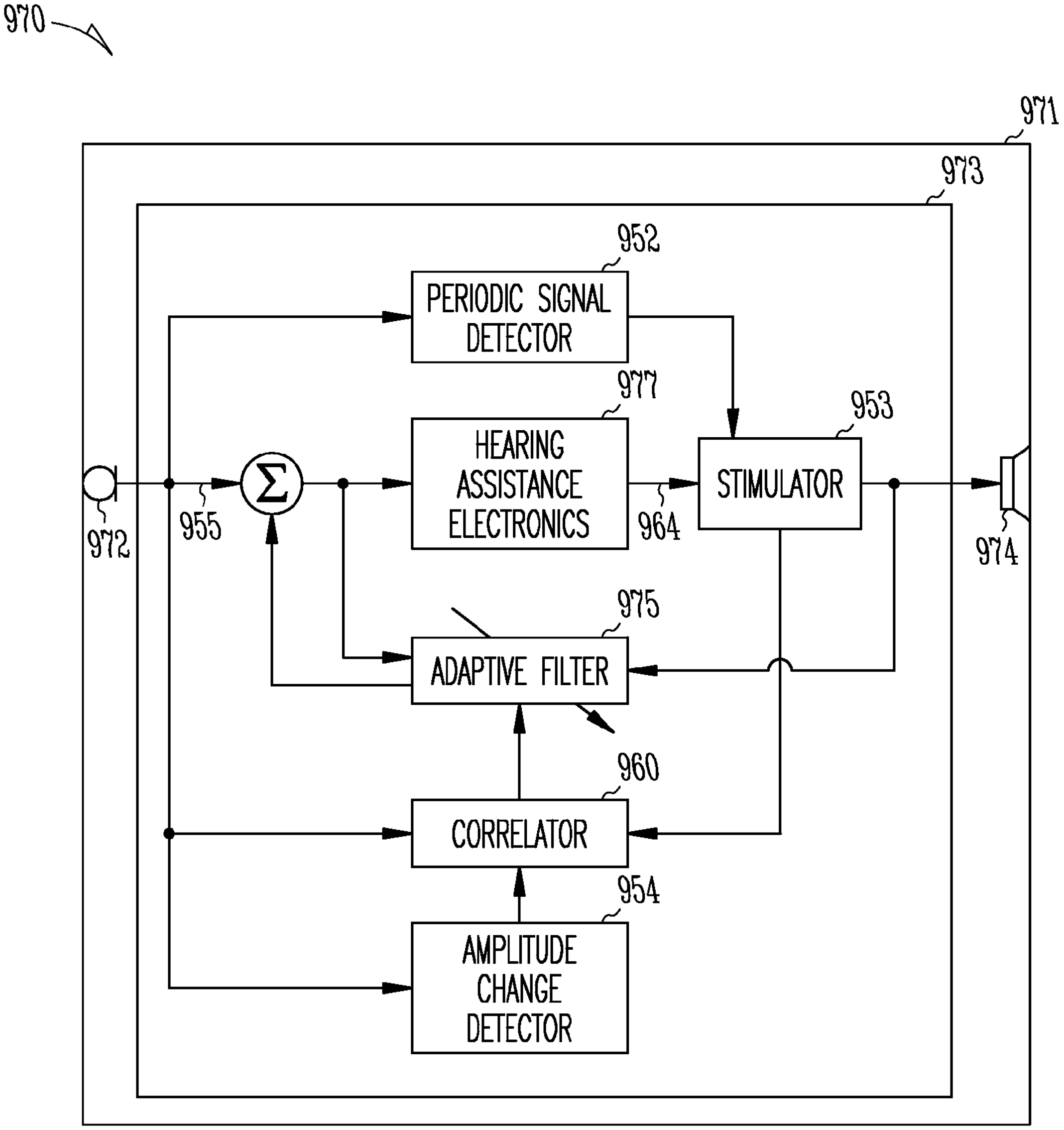

FIG. 9B illustrates a hearing assistance device according to one embodiment of the present subject matter. FIG. 9B shows a hearing assistance device 970 including a housing 971, a microphone 972, a speaker 974 and signal processing electronics 973. Generally, the signal processing electronics 973 receives an audio input signal 955 from the microphone 972, processes the audio input signal using hearing assistance electronics 977 and transmits the processed signal 964 to the speaker 974 for broadcast to a user's ear. In the illustrated embodiment, the signal processing electronics 973 include a periodic signal detector 952, a stimulator 953, an amplitude change detector 954 and a correlator 960 for detecting periodic signals and distinguishing periodic feedback signals from periodic environmental signals. Periodic environmental signals include tonal sound signals. Examples of periodic environmental signals include music, a chime, a buzzer and alarms.

In various embodiments, the periodic signal detector 952 detects periodic audio input signals. The periodic signal detector 952 communicates information about the detected signal to the stimulator 953. The stimulator 953 modifies the signal and transmits the modified signal to the speaker 974. In various embodiments, the stimulator 953 adjusts the phase of the detected signal. In various embodiments, the stimulator 953 adjusts the frequency of the signal. In various embodiments, stimulator adjustments of the detected periodic signal results in little of any discernable acoustic distortion for the user. In various embodiments, the stimulator 953 adjusts signals using a constant frequency shifting. In various embodiments, the stimulator 953 adjusts signals using frequency scaling. In various embodiments, the stimulator 953 adjusts signals using an all-pass filter to adjust phase. In various embodiments, the stimulator 953 adjusts signals using a phasor multiplier. In various embodiments, the stimulator 953 adjusts signals using a delay element.

The amplitude change detector 954 monitors periodic signals from the microphone. Upon reception of a periodic signal, the amplitude change detector 954 tracks amplitude changes of the original signal and subsequent modified signals. The amplitude change detector 954 communicates with the correlator 960. The correlator 960 receives information about received signals, information about detected amplitude changes and information about modified signals. The correlator monitors this information and determines when a detected periodic signal is a feedback signal using the polarity and magnitude of a detected amplitude change. The correlator 960 communicates information about detected periodic feedback signals to a filter module 975 for attenuation or cancellation of the detected periodic feedback signal. In the illustrated embodiment, the filter is an adaptive feedback filter 975. In general, the adaptive feedback cancellation filter adjusts itself to compensate for time-varying acoustic feedback paths. The adjustment of the filter is accomplished using a process that updates coefficients of the filter. In various embodiments, the adaptive feedback filter 975 includes a Least Mean Square (LMS) coefficient update process. In various embodiments, the adaptive feedback filter includes an N-LMS coefficient update process. Some embodiments, use adjustable adaptation rates to reduce periodic feedback signals. In various embodiments, upon detection of a periodic feedback signal the correlator activates or adjusts a filter. For example, in some applications the correlator adjusts the gain of a filter to attenuate the periodic feedback signal. In some embodiments, a notch filter is used to attenuate detected periodic feedback signals. In some embodiments, detected periodic feedback signal energy is attenuated using the correlator to adjust a modulation rate of an output phase modulation system. Such output phase modulation systems include, but are not limited to, the output phase modulation system described in U.S. patent application Ser. No. 11/276,763 which was filed on Mar. 13, 2006, and is hereby incorporated by reference in its entirety. Other output phase modulation systems may be employed without departing from the scope of the present subject matter. In various embodiments, detected periodic feedback signal energy is attenuated using the correlator to adjust a modulation rate of an output frequency modulation system.

In various embodiments, different adaptive filter systems are employed to reduce feedback. In one embodiment, a feedback canceller is employed which provides reduction of acoustic feedback. Various types of acoustic feedback cancellers include, but are not limited to adaptive filters, such as LMS adaptive filters N-LMS adaptive filters, Filtered-X LMS adaptive filters, Recursive Least Squares adaptive filters, phase cancellation and phase management, heuristic based feedback management, or any other system that uses correlation, prediction, and/or optimization to estimate and reduce feedback that operates in the time domain or any other signal decomposition domain using both linear or non-linear transformations. In one embodiment, a feedback canceller is employed and its adaptation rate is adjusted to provide reduction of acoustic feedback. In one embodiment, a frequency band in which the acoustic feedback is detected is attenuated to provide reduction of acoustic feedback. Such embodiments may be conducted in subband processing models that allow for the attenuation of one or more subbands. In one embodiment, a notch filter is adjusted which is used to reduce acoustic feedback within the frequency region of the notch. Other attenuation methods include, but are not limited to shifting the phase and/or frequency of the output or modifying the amount of shift by using either a deterministic or random method, such that it breaks the feedback regenerative loop.

In various embodiments, the signal processing electronics 973 are implemented using a combination of hardware, software and firmware. In various embodiments, the signal processing electronics 973 are implemented with analog devices, digital devices or a combination of analog and digital devices. In various embodiments, the signal processing electronics 973 are implemented using a digital signal processor (DSP). Other embodiments exist in different combinations without departing from the scope of the present subject matter.

The present subject matter includes hearing assistance devices, including, but not limited to, cochlear implant type hearing devices, hearing aids, such as behind-the-ear (BTE), in-the-ear (ITE), in-the-canal (ITC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in-the-canal. It is understood that other hearing assistance devices not expressly stated herein may fall within the scope of the present subject matter.

This application is intended to cover adaptations and variations of the present subject matter. It is to be understood that the above description is intended to be illustrative, and not restrictive. The scope of the present subject matter should be determined with reference to the appended claim, along with the full scope of legal equivalents to which the claims are entitled.

What is claimed is:

1. A method for processing signals in an audio system having an input, an output, and a signal processor, comprising:

detecting a first periodic signal received at an input of the audio system;

adjusting frequency of the first periodic signal in response to detecting the first periodic signal;

comparing an amplitude of the first periodic signal before adjusting the frequency to the amplitude of the first periodic signal after adjusting the frequency to determine a first amplitude change; and determining whether the first periodic signal is a periodic feedback signal based on the first amplitude change.

2. The method of claim 1, wherein adjusting frequency includes shifting frequency using constant frequency shifting.

3. The method of claim 1, wherein adjusting frequency includes shifting frequency using frequency scaling.

4. The method of claim 1, wherein determining whether the first periodic signal is a periodic feedback signal includes treating the first periodic signal as a periodic feedback signal if the first amplitude change is negative and the magnitude of the first amplitude change exceeds a threshold.

5. The method of claim 1, further comprising attenuating energy in the spectral vicinity of the first periodic signal to attenuate acoustic feedback when the first periodic signal is determined to be a periodic feedback signal.

6. The method of claim 5, wherein the attenuating energy comprises attenuating energy in a frequency band of a sub-band process.

7. The method of claim 1, further comprising if the first periodic signal is determined to be a periodic feedback signal then activating a feedback canceller.

8. The method of claim 7, further comprising adjusting an adaptation rate of the feedback canceller.

9. The method of claim 1, further comprising applying output phase modulation, and if the first periodic signal is determined to be a periodic feedback signal then adjusting a modulation rate of the output phase modulation.

10. A method for processing signals in a hearing aid having an input, an output, and a signal processor, the method comprising:

detecting a first periodic signal received at an input of the hearing aid;

adjusting phase of the first periodic signal in response to detecting the first periodic signal;

comparing an amplitude of the first periodic signal before adjusting the phase to the amplitude of the first periodic signal after adjusting the phase to determine a first amplitude change; and determining whether the first periodic signal is a periodic feedback signal based on the first amplitude change.

11. The method of claim 10, wherein adjusting phase includes shifting phase using an all-pass filter.

12. The method of claim 10, wherein adjusting phase includes shifting phase using a phasor multiplier.

13. The method of claim 10, wherein adjusting phase includes shifting phase using a delay element.

14. The method of claim 10, wherein determining whether the first periodic signal is a periodic feedback signal includes treating the first periodic signal as a periodic feedback signal if the first amplitude change is negative and the magnitude of the first amplitude change exceeds a threshold.

15. The method of claim 10, further comprising attenuating energy in the spectral vicinity of the first periodic signal to attenuate acoustic feedback when the first periodic signal is determined to be a periodic feedback signal.

16. The method of claim 15, wherein the attenuating energy comprises attenuating energy in a frequency band of a sub-band process.

17. The method of claim 10, further comprising if the first periodic signal is determined to be a periodic feedback signal then activating a feedback canceller.

18. The method of claim 17, further comprising adjusting an adaptation rate of the feedback canceller.

19. The method of claim 10, further comprising applying output phase modulation, and if the first periodic signal is determined to be a periodic feedback signal then adjusting a modulation rate of the output phase modulation.

20. A hearing assistance device, comprising:

a microphone configured to receive sound and provide an input signal;

signal processing electronics configured to receive the input signal, to adjust phase or frequency of the input signal, and to detect a periodic feedback signal using amplitude of the input signal and amplitude of the adjusted input signal; and a speaker in communication with the signal processing electronics.

21. The device of claim 20, wherein the signal processing electronics comprises a digital signal processor programmed to include a periodic signal detector adapted to detect periodic signals.

22. The device of claim 20, wherein the signal processing electronics comprises a feedback canceller configured to cancel the detected periodic feedback signals.

23. The device of claim 20, wherein the signal processing electronics comprises a feedback canceller configured to attenuate the detected periodic feedback signals.

* * * * *